United States Patent
Hoshino (10) Patent No.: US 12,119,766 B2
(45) Date of Patent: Oct. 15, 2024

(54) CONTROL DEVICE AND CONTROL METHOD FOR ROTATING ELECTRIC MACHINE

(71) Applicant: HITACHI ASTEMO, LTD., Hitachinaka (JP)

(72) Inventor: Katsuhiro Hoshino, Ibaraki (JP)

(73) Assignee: Hitachi Astemo, Ltd., Hitachinaka (JP)

(*) Notice: Subject to any disclaimer, the term of this patent is extended or adjusted under 35 U.S.C. 154(b) by 408 days.

(21) Appl. No.: 17/611,285

(22) PCT Filed: Apr. 28, 2020

(86) PCT No.: PCT/JP2020/018067
§ 371 (c)(1),
(2) Date: Nov. 15, 2021

(87) PCT Pub. No.: WO2020/235316
PCT Pub. Date: Nov. 26, 2020

(65) Prior Publication Data
US 2022/0227238 A1    Jul. 21, 2022

(30) Foreign Application Priority Data
May 17, 2019 (JP) .................... 2019-093419

(51) Int. Cl.
*H02P 25/22* (2006.01)
*B60L 7/14* (2006.01)
(Continued)

(52) U.S. Cl.
CPC ............ *H02P 25/22* (2013.01); *H02P 6/08* (2013.01); *H02P 23/28* (2016.02); *B60L 7/14* (2013.01);
(Continued)

(58) Field of Classification Search
CPC .. H02P 25/22; H02P 23/28; H02P 6/08; H02P 23/20; H02P 27/06; B60L 7/14; B60L 15/2009
See application file for complete search history.

(56) References Cited

U.S. PATENT DOCUMENTS

| | | | |
|---|---|---|---|
| 8,604,739 B2 * | 12/2013 | Atarashi | B60L 7/14 318/494 |
| 9,692,342 B2 * | 6/2017 | Kano | H02K 3/28 |

(Continued)

FOREIGN PATENT DOCUMENTS

| | | | |
|---|---|---|---|
| CN | 103906648 A * | 7/2014 | ............ B60K 6/445 |
| JP | 2007-259644 A | 10/2007 | |

(Continued)

OTHER PUBLICATIONS

International Search Report with English translation and Written Opinion issued in corresponding application No. PCT/JP2020/018067 dated Aug. 11, 2020.
(Continued)

*Primary Examiner* — Thienvu V Tran
*Assistant Examiner* — Yahveh Comas Torres
(74) *Attorney, Agent, or Firm* — Foley & Lardner LLP (57) ABSTRACT

An object of the present invention is to control driving force and braking force of a motor while considering an SOC of a battery. A control device controlling a rotating electric machine including windings of a plurality of independent system. The rotating electric machine is controlled in: a first mode in which an AC current is energized to the windings of the plurality of systems to generate torque such that a combined magnetic field generated in the windings is greater than or equal to a predetermined value; and a second mode in which the AC current having a phase difference different from that in the first mode is energized to the windings of the plurality of systems, the combined magnetic field generated
(Continued)

in the windings is made smaller than the predetermined value, and current greater than or equal to that in the first mode flows.

4 Claims, 7 Drawing Sheets

(51) Int. Cl.
*H02P 6/08* (2016.01)
*H02P 23/20* (2016.01)
*H02P 23/28* (2016.01)
*B60L 15/20* (2006.01)
*H02P 27/06* (2006.01)

(52) U.S. Cl.
CPC .......... *B60L 15/2009* (2013.01); *H02P 23/20* (2016.02); *H02P 27/06* (2013.01)

(56) References Cited

U.S. PATENT DOCUMENTS

| | | | | |
|---|---|---|---|---|
| 9,979,329 | B2 * | 5/2018 | Tago | ........................ H02P 6/28 |
| 2007/0241699 | A1 * | 10/2007 | Osada | ........................ H02P 5/74 |
| | | | | 318/141 |
| 2008/0246363 | A1 * | 10/2008 | Atarashi | ................ H02P 21/02 |
| | | | | 322/16 |
| 2010/0026216 | A1 * | 2/2010 | Atarashi | ................ H02P 21/22 |
| | | | | 318/400.02 |
| 2015/0091481 | A1 * | 4/2015 | Tago | ........................ H02P 6/28 |
| | | | | 318/400.2 |
| 2019/0280629 | A1 * | 9/2019 | Furukawa | .............. H02P 21/06 |

FOREIGN PATENT DOCUMENTS

| | | | |
|---|---|---|---|
| JP | 2012-115031 A | 6/2012 | |
| JP | 2016-187237 A | 10/2016 | |
| WO | WO-2018037506 A1 * | 3/2018 | ............. B62D 5/046 |

OTHER PUBLICATIONS

Office Action issued in corresponding Japanese Application No. 2021-520682 dated Dec. 6, 2022 with English Machine Translation (10 pages).

* cited by examiner

CONTROL DEVICE AND CONTROL METHOD FOR ROTATING ELECTRIC MACHINE

TECHNICAL FIELD

The present invention relates to a control device for a rotating electric machine.

BACKGROUND ART

Background art of the present technical field includes the following prior art. PTL 1 (JP 2007-259644 A) discloses a power generation electric device for a vehicle including: a generator motor including at least two three-phase windings disposed apart from each other by a predetermined spatial phase difference; at least two orthogonal converters individually exchanging a three-phase AC current with each of the three-phase windings; and a controller that controls the orthogonal converter. In the power generation electric device for the vehicle, the controller intermittently controls a switching element of a first orthogonal converter in response to a request for torque or a rotation speed to energize the first three-phase winding with a first three-phase AC current, and a switching element of the second orthogonal converter is intermittently controlled such that a second three-phase AC current with which the second three-phase winding is energized secures a predetermined current phase difference with respect to the first three-phase AC current.

CITATION LIST

Patent Literature

PTL 1: JP 2007-259644 A

SUMMARY OF INVENTION

Technical Problem

A regenerative brake that decelerates by regenerative torque of a motor is adopted in an electric vehicle or a hybrid vehicle. In addition, a regenerative cooperative brake using both the regenerative brake and a mechanical brake requires a dedicated brake system that controls switching between the regenerative brake and the mechanical brake, and it is difficult to adopt the regenerative cooperative brake in many automobiles from the viewpoint of cost. For this reason, desirably the regenerative brake performs control from deceleration to stopping.

However, when the deceleration to the stopping of the vehicle is controlled only by the regenerative brake, a margin in which electric power can be received by a battery during braking is required. For this reason, there is a demand for a method of controlling driving force and braking force of the motor while a state of charge (SOC) of the battery is considered.

Solution to Problem

A representative example of the invention disclosed in the present application is as follows. That is, a control device controlling a rotating electric machine including windings of a plurality of independent system. The rotating electric machine is controlled in: a first mode in which an AC current is energized to the windings of the plurality of systems to generate torque such that a combined magnetic field generated in the windings is greater than or equal to a predetermined value; and a second mode in which the AC current having a phase difference different from that in the first mode is energized to the windings of the plurality of systems, the combined magnetic field generated in the windings is made smaller than the predetermined value, and current greater than or equal to that in the first mode flows.

Advantageous Effects of Invention

According to one aspect of the present invention, the driving force and the braking force of the rotating electric machine can be controlled while the SOC of the battery is considered. Objects, configurations, and advantageous effects other than those described above will be clarified by the descriptions of the following embodiment.

DESCRIPTION OF EMBODIMENTS

Hereinafter, embodiments will be described with reference to the drawings.

Figure 1:
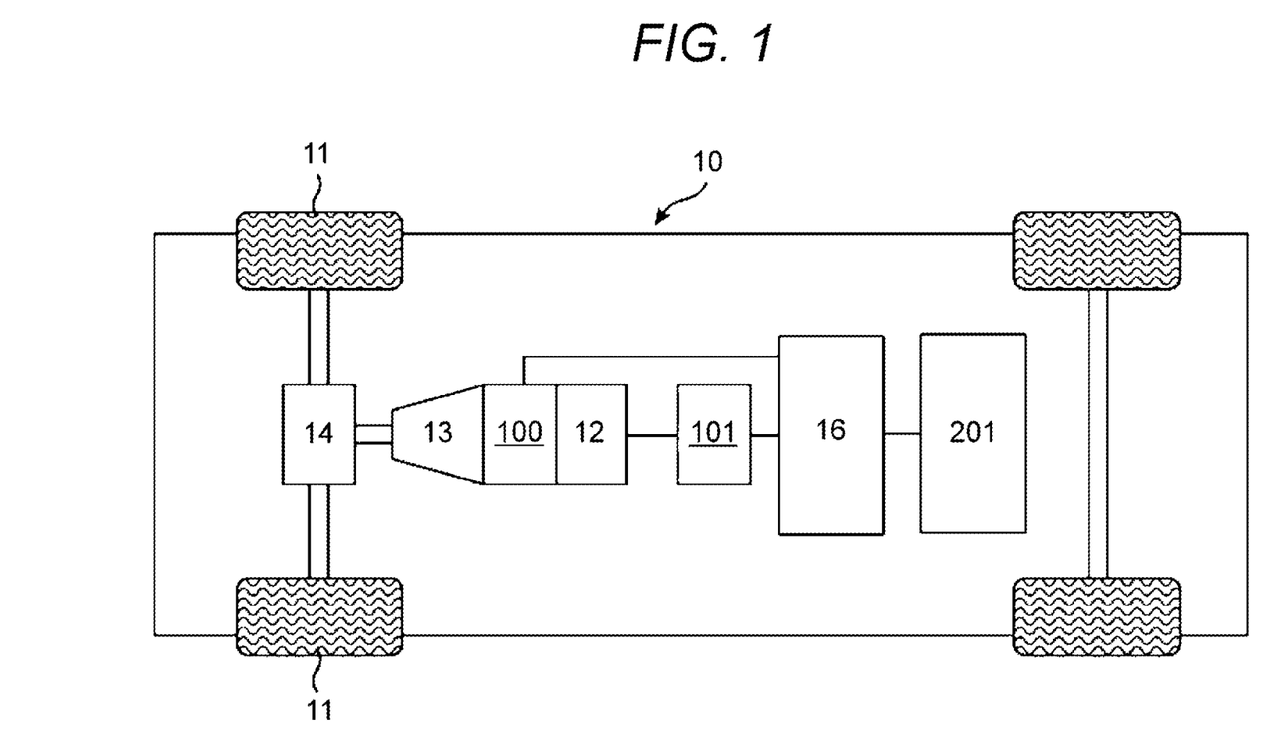
FIG. 1 is a schematic configuration diagram illustrating a hybrid electric vehicle equipped with a rotating electric machine driving system according to an embodiment of the present invention.

FIG. 1 is a diagram illustrating a configuration of a vehicle (a hybrid vehicle or an electric vehicle) 10 on which a rotating electric machine control device 16 according to an embodiment of the present invention is mounted.

For example, the vehicle 10 that is of the hybrid vehicle is equipped with an engine 12, a first rotating electric machine 100, a second rotating electric machine 101, and a high-voltage battery 201. The battery 201 includes a secondary battery such as a lithium ion battery or a nickel hydrogen battery, and outputs high voltage DC power of 250 V to 600 V or higher. The battery 201 supplies the DC power to the rotating electric machines 100, 101 when the driving force by the rotating electric machines 100, 101 is required, and the DC power is supplied from the rotating electric machines 100, 101 during regenerative running. The DC power between the battery 201 and the rotating electric machines 100, 101 is transmitted and received through the rotating electric machine control device 16.

Although not illustrated, the vehicle 10 is equipped with an auxiliary battery that supplies low voltage power (for example, 14 volt-system power). Rotating torque generated by the engine 12 and the rotating electric machines 100, 101 is transmitted to a front wheel 11 through a transmission 13 and a differential gear 14. Because the rotating electric machines 100, 101 are configured substantially identically, the rotating electric machine 100 will be described below.

The rotating electric machine 100 is a built-in permanent magnet type three-phase synchronous motor. The rotating electric machine 100 operates as an electric motor that rotates a rotor by supplying a three-phase AC current to a stator coil wound around a stator core. When driven by the engine 12, the rotating electric machine 100 operates as a generator to output generated power of the three-phase alternating current. That is, the rotating electric machine 100 has both a power running function as the electric motor that generates the rotating torque using electric energy and a regenerative function as the generator that generates the power using mechanical energy, and the above-described functions can be selectively used depending on a running state of the automobile.

The vehicle 10 accelerates and decelerates when a driver operates a throttle pedal and a brake pedal (not illustrated). For example, when the driver operates the throttle pedal, the driving force is generated according to a depression amount, and power running is performed. When the driver operates the brake pedal, braking force is generated according to the depression amount, and the regenerative running is performed.

In addition, the vehicle 10 may be accelerated and decelerated by the driver operating a single throttle pedal (not illustrated). In this case, the power running is performed to generate the driving force when the driver steps on the throttle pedal to generate the large operation amount of the throttle pedal, and the regenerative running is performed to generate the braking force when the operation amount of the throttle pedal is small.

Figure 2:
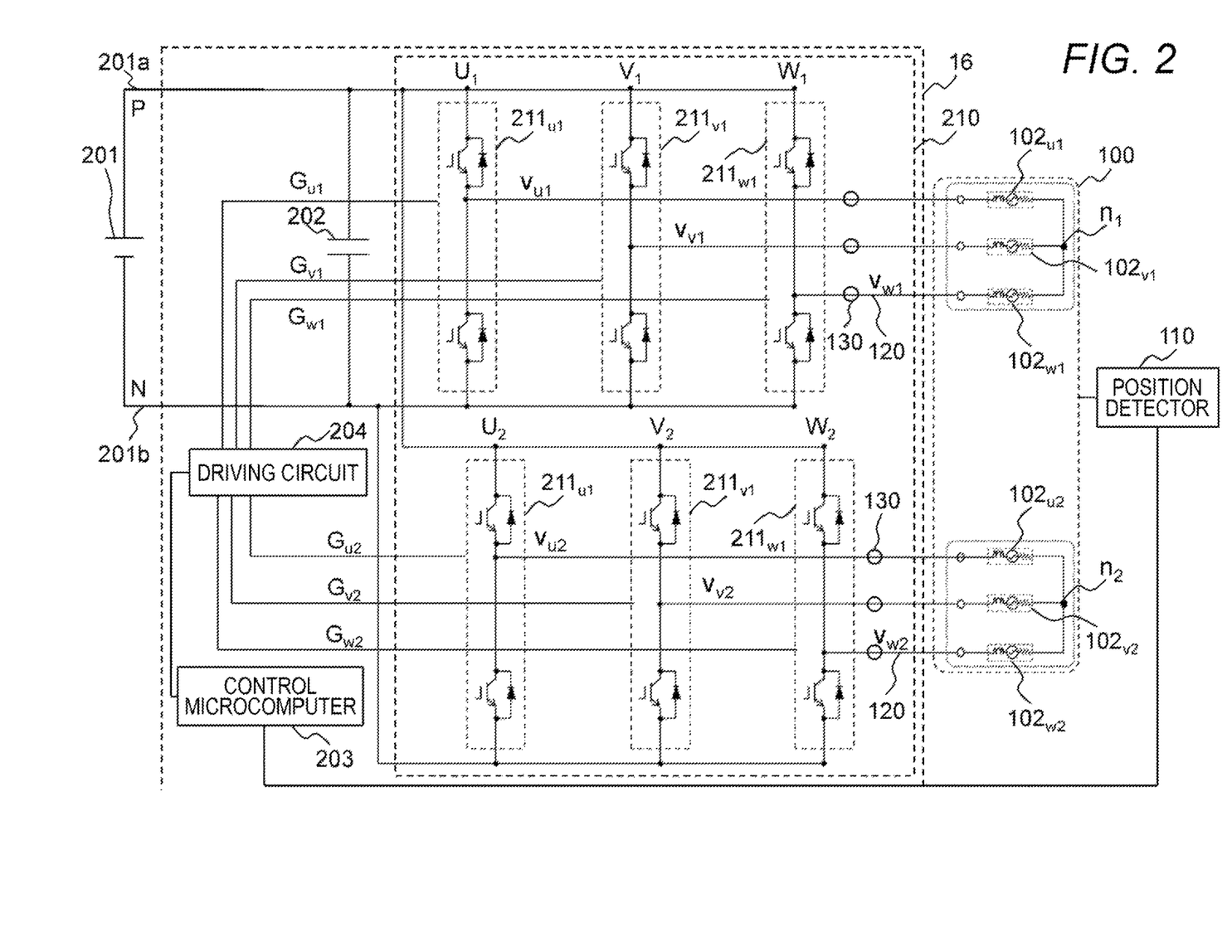
FIG. 2 is a diagram illustrating a configuration of the rotating electric machine driving system and a rotating electric machine of the embodiment.

FIG. 2 is a diagram illustrating a configuration of the rotating electric machine control device 16 and the rotating electric machine 100 of the embodiment. Although the control of the rotating electric machine 100 will be described below, the rotating electric machine 101 can be similarly controlled.

The rotating electric machine control device 16 of the embodiment 1 controls driving of the rotating electric machine 100. For example, the rotating electric machine 100 is a motor for running of the vehicle 10. The rotating electric machine control device 16 includes a battery 201, a capacitor 202, a control microcomputer 203, a driving circuit 204, and an inverter circuit 210.

The rotating electric machine 100 is a Y-connection three-phase AC rotating electric machine of two independent systems. That is, the rotating electric machine 100 includes three-phase armature windings 102$u$1, 102$v$1, 102$w$1 respectively corresponding to a U1 phase, a V1 phase, a W1 phase of a first system, and three-phase armature windings 102$u$2, 102$v$2, 102$w$2 respectively corresponding to a U2 phase, a V2 phase, a W2 phase of a second system. Different current can flow in each phase because the armature windings 102$u$ to 102$w$ of each system are provided independently of each other. The armature winding 102 is connected at neutral points n1, n2 for each system. The neutral points n1, n2 may be provided inside the rotating electric machine 100 as illustrated in FIG. 2, or provided outside the rotating electric machine 100.

The inverter circuit 210 drives the rotating electric machine 100 by independently controlling currents flowing through the armature windings 102$u$ to 102$w$. A position detector 110 that detects a magnetic pole position of the rotating electric machine 100 is attached to an output shaft of the rotating electric machine 100. A detection result of the magnetic pole position by the position detector 110 is output to the control microcomputer 203.

The battery 201 supplies the DC power to the inverter circuit 210 through DC buses 201$a$, 201$b$. For example, a secondary battery such as a lithium ion battery can be used as the battery 201.

The capacitor 202 absorbs a fluctuation in the DC voltage caused by the operation of the inverter circuit 210, and is connected in parallel with the inverter circuit 210 between the DC bus 201$a$ and the DC bus 201$b$.

The control microcomputer 203 performs a predetermined current control arithmetic operation, and outputs a control signal instructing the output voltage and the output current of each phase to the driving circuit 204 based on an arithmetic result. The driving circuit 204 outputs drive signals Gu1, Gv1, Gw1 to bridge circuits 211$u$1, 211$v$1, 211$w$1 of the respective phases of the inverter circuit 210, respectively. By operating the bridge circuits 211$u$1, 211$v$1, 211$w$1 according to the drive signals Gu1, Gv1, Gw1, the control microcomputer 203 controls the inverter circuit 210 through the driving circuit 204.

The inverter circuit 210 includes bridge circuits 211$u$1, 211$v$1, 211$w$1 corresponding to a U phase, a V phase, a W phase of the first system, respectively. Each of the bridge circuits 211$u$1, 211$v$1, 211$w$1 includes an IGBT that functions as a switching element of each of the upper and lower arms, and a diode provided in parallel with each IGBT. In the bridge circuits 211$u$1, 211$v$1, 211$w$1, each IGBT performs a switching operation according to the drive signals Gu1, Gv1, Gw1 from the driving circuit 204. Thus, the DC power supplied from the battery 201 is converted into three-phase AC power, and the AC current is output from the bridge circuits 211$u$1, 211$v$1, 211$w$1 to the armature windings 102$u$1, 102$v$1, 102$w$1 of each phase of the rotating electric machine 100 through an AC output lines 120 of each phase.

The AC output line 120 of each phase is provided with a current sensor 130 detecting each current flowing through the armature windings 102$u$1, 102$v$1, 102$w$1 of the rotating electric machine 100. In the illustrated example, the current sensor 130 is provided inside the inverter circuit 210. However, the current sensor 130 may be provided outside the inverter circuit 210. The current value of each phase detected by the current sensor 130 is output to the control microcomputer 203. The control microcomputer 203 performs predetermined current control arithmetic operation based on the operation of the throttle pedal and the brake pedal by the driver, a control command input from another ECU, the current value of each phase input from the current sensor 130, and the detection of the magnetic pole position by the position detector 110, and outputs a control signal instructing the driving circuit 204 to output the drive signals Gu1, Gv1, and Gw1 of each phase based on the arithmetic result.

Although the operations of the control microcomputer 203, the driving circuit 204, and the inverter circuit 210 have been described above for the first system, the second system operates similarly. As described above, by controlling the amplitude and phase of the AC current of each phase, the magnitude and direction of the magnetomotive force of the armature winding 102 of each system are controlled, the direction and magnitude of a combined magnetomotive force are controlled, the magnitude of the current, the magnitude of the power running torque, and the magnitude of the regenerative torque are adjusted, and the amount of energy input to and output from the battery 201 is adjusted.

Figure 3:
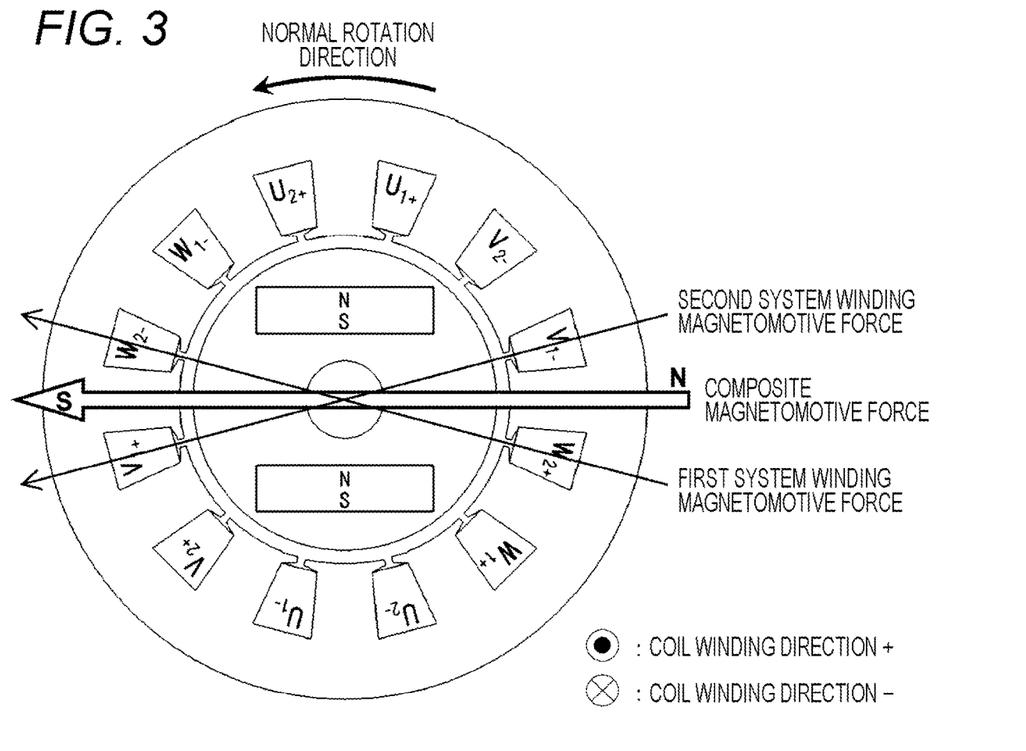
FIG. 3 is a diagram illustrating a magnetomotive force vector in a first mode during power running of the embodiment.
Figure 4:
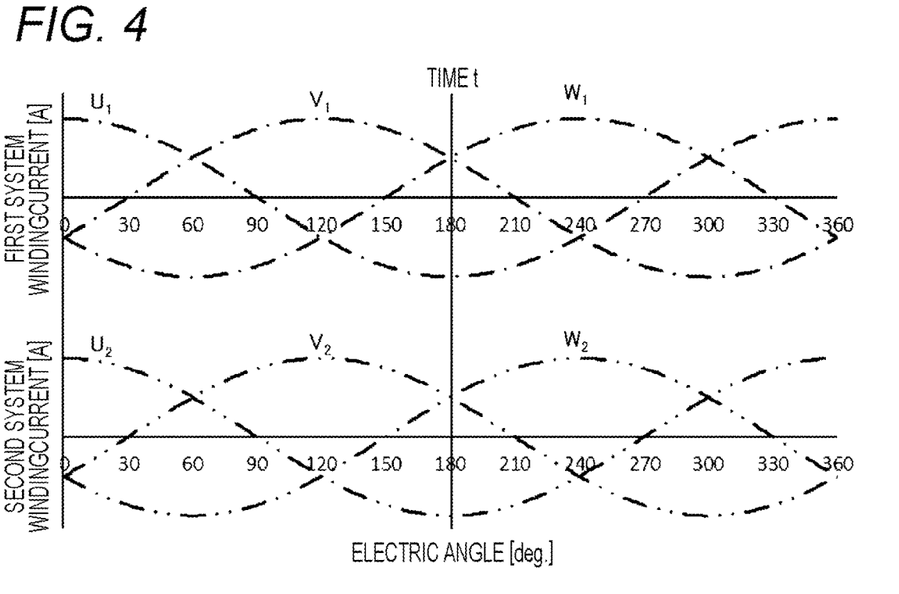
FIG. 4 is a diagram illustrating a current waveform in the first mode during the power running of the embodiment.

FIG. 3 is a diagram illustrating a magnetomotive force vector in a first mode during the power running, and FIG. 4 is a diagram illustrating a current waveform in the first mode during the power running.

In the first mode during the power running, in-phase currents are caused to flow through the armature windings 102 of the respective systems, and the control is performed such that the direction of the magnetomotive force by the armature windings 102 of the first system and the direction of the magnetomotive force by the armature windings 102 of the second system approach each other. That is, as illustrated in FIG. 3, the direction of the magnetomotive force of each system deviates from the difference (30° in FIG. 3) in a winding position of the armature winding 102 of each system, but the combined magnetomotive force is in the direction close to the direction of the magnetomotive force of each system, the combined magnetomotive force increases, and the generated torque increases. That is, in the first mode, a current amplitude Ia and a current phase β (current phase β=0) are adjusted such that the current value decreases with respect to the target torque.

Although the directions of the magnetomotive forces of the systems are shifted by 30° in the case of FIG. 3, the directions of the magnetomotive forces of the respective systems can be equalized to each other by causing the current advanced by 30° from the armature winding 102 of the first system to flow through the armature winding 102 of the second system. In this way, the combined magnetomotive force can be increased greater than that in the first mode during the power running in FIG. 3.

Figure 5:
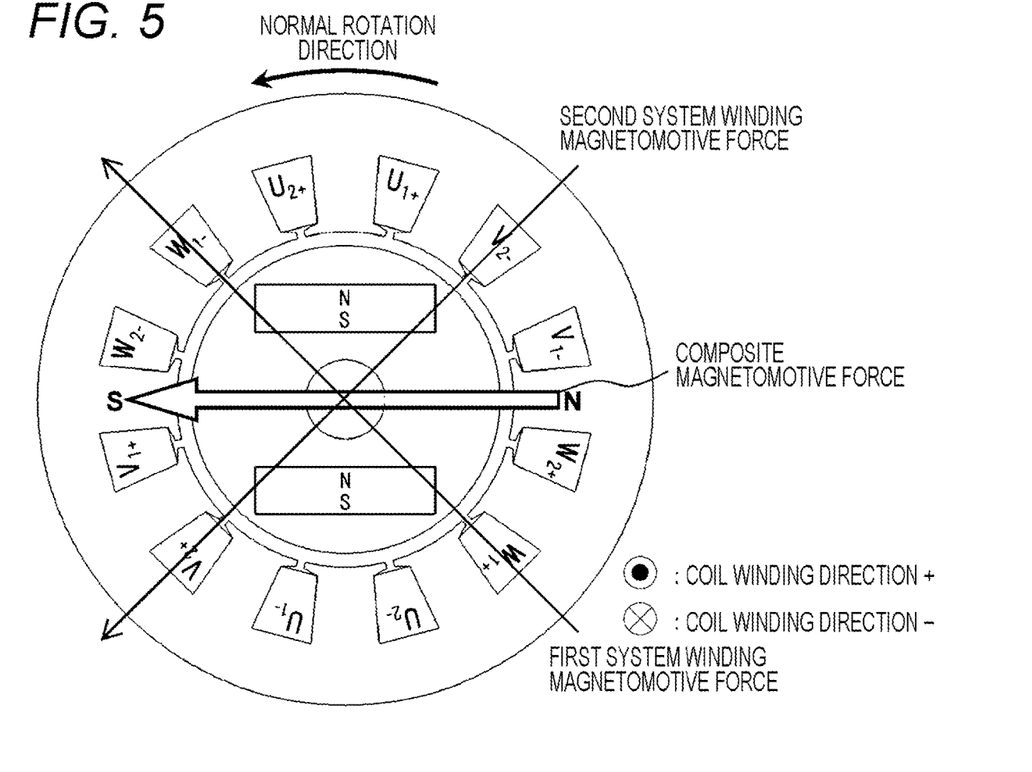
FIG. 5 is a diagram illustrating the magnetomotive force vector in a second mode during the power running of the embodiment.
Figure 6:
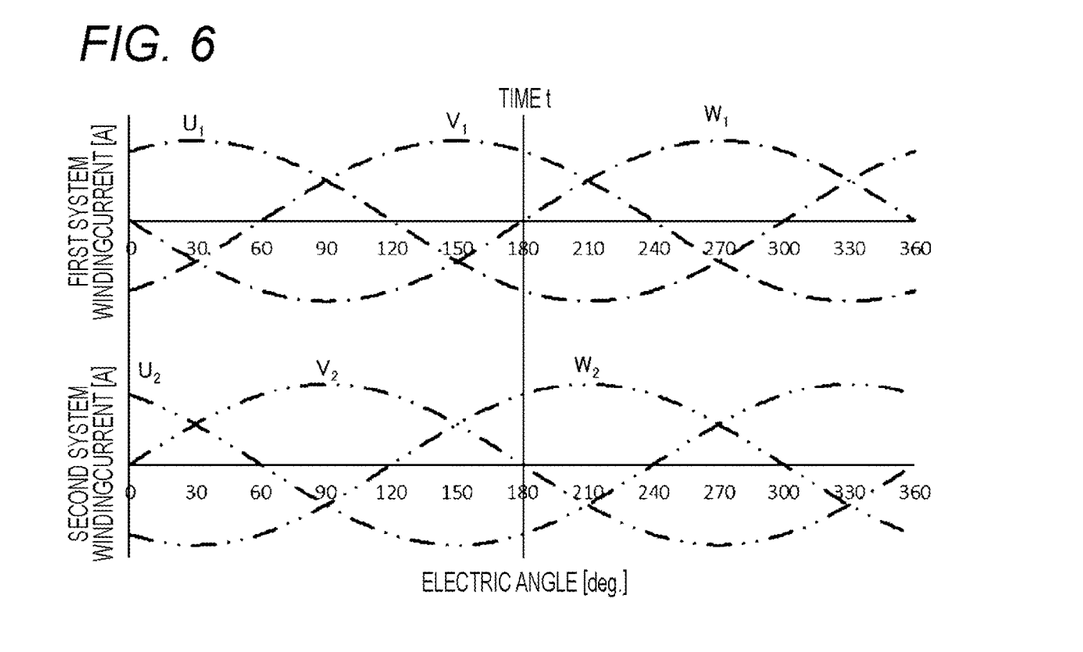
FIG. 6 is a diagram illustrating the current waveform in the second mode during the power running of the embodiment.

FIG. 5 is a diagram illustrating the magnetomotive force vector in a second mode during the power running, and FIG. 6 is a diagram illustrating the current waveform in the second mode during the power running.

In the second mode during the power running, the currents of different phases (for example, 60° as illustrated in FIG. 6) are caused to flow through the armature windings 102 of each systems, and the control is performed such that the direction of the magnetomotive force by the armature windings 102 of the first system and the direction of the magnetomotive force by the armature windings 102 of the second system are orthogonal to each other. Specifically, as illustrated in FIG. 5, the direction of the magnetomotive force of each system is shifted by 90° of a sum of the phase difference 60° of the current of each system and the difference (30° in FIG. 5) of the winding position of the armature winding 102 of each system, and the combined magnetomotive force becomes small. That is, in the second mode, the current amplitude Ia and the current phase β (current phase β=0) are adjusted such that the current value increases with respect to the target torque.

As described above, the control microcomputer 203 selects the first mode, the second mode, or another operation mode during the power running according to the operation amount of the throttle pedal by the driver, and controls the amplitude and the phase of the current flowing through the armature winding 102 of the rotating electric machine 100. For example, in the first mode during the power running, the current value can be reduced in order to obtain the same torque, and the vehicle can be controlled with high energy consumption efficiency. On the other hand, in the second mode during the power running, the current value can be increased in order to obtain the same torque, the energy consumption can be increased as compared with the first mode, and the SOC of the battery 201 can be controlled so as not to be high. For example, in what is called look-ahead control in which the running is controlled in consideration of a situation of a future running route, desirably charging and discharging of the battery 201 is controlled depending on a gradient of a previous road and a traffic situation. Specifically, when the battery 201 is actively consumed in the second mode before entering a downhill, the required braking force by the regeneration is obtained on the downhill.

Figure 7:
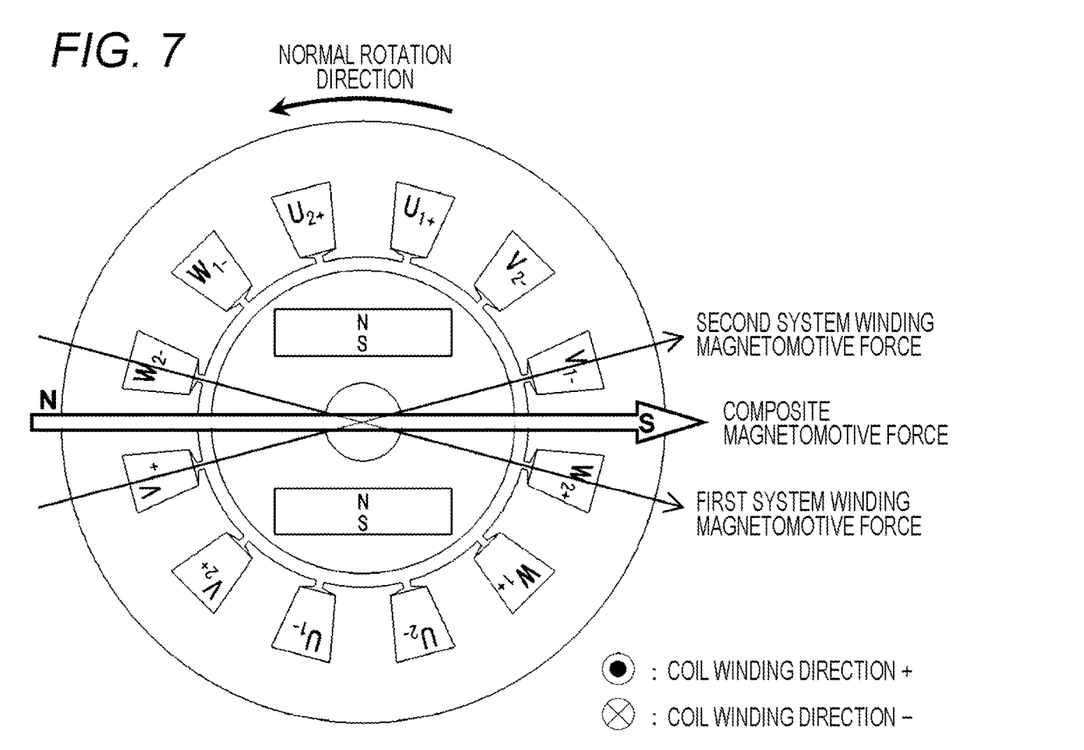
FIG. 7 is a diagram illustrating the magnetomotive force vector in the first mode during regeneration of the embodiment.
Figure 8:
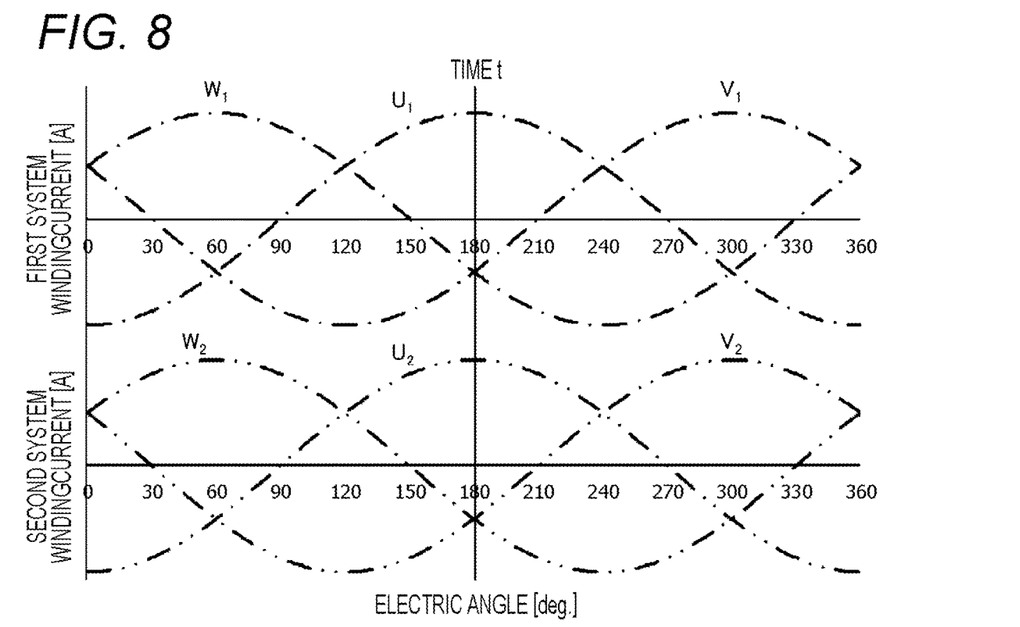
FIG. 8 is a diagram illustrating the current waveform in the first mode during the regeneration of the embodiment.

FIG. 7 is a diagram illustrating the magnetomotive force vector in the first mode during regeneration, and FIG. 8 is a diagram illustrating the current waveform in the first mode during the regeneration. The control microcomputer 203 selects the first mode during the regeneration at the time of deceleration according to the operation amount of the throttle pedal or the brake pedal by the driver, and controls the amplitude and the phase of the current flowing to the armature winding 102 of the rotating electric machine 100.

In the first mode during the regeneration, the in-phase currents are caused to flow through the armature windings 102 of the respective systems, and the control is performed such that the direction of the magnetomotive force by the armature windings 102 of the first system and the direction of the magnetomotive force by the armature windings 102 of the second system approach each other. That is, as illustrated in FIG. 7, the direction of the magnetomotive force of each system deviates from the difference (30° in FIG. 7) in the winding position of the armature winding 102 of each system, but the combined magnetomotive force is in the direction close to the direction of the magnetomotive force of each system, the magnitude of the combined magnetomotive force increases, and the generated torque increases. In the first mode, because the current amplitude Ia and the current phase β (current phase β=180) are adjusted such that the current value is minimized with respect to the target torque, the efficiency of the generator is lowered, and the current for obtaining the desired torque (braking force) is reduced.

Figure 9:
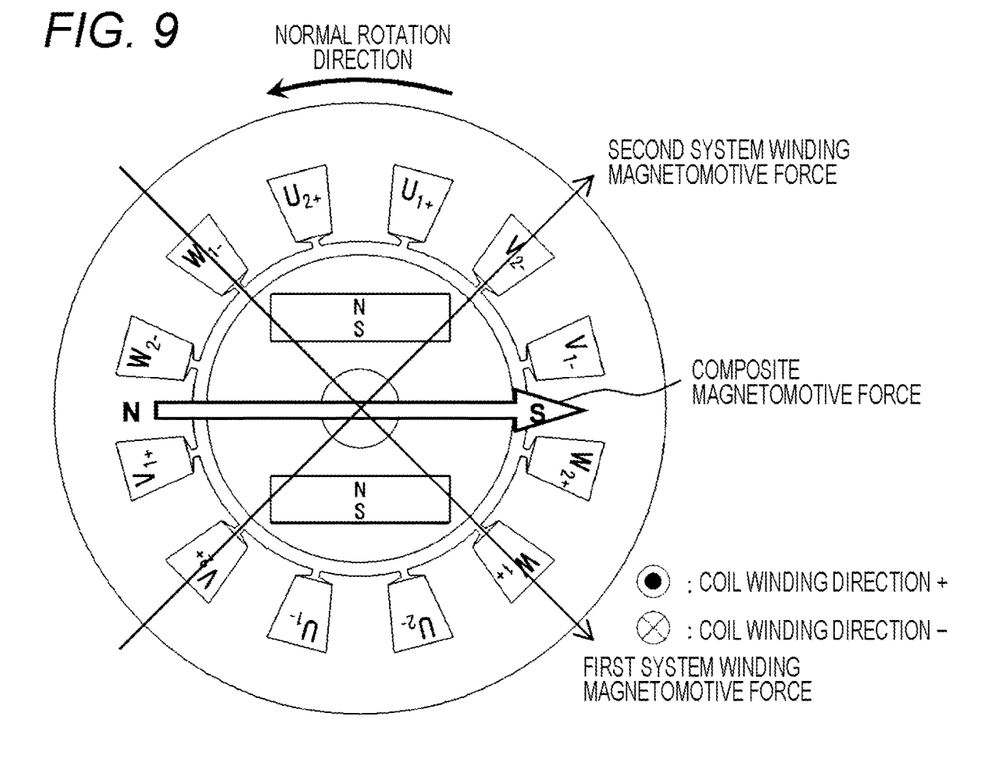
FIG. 9 is a diagram illustrating the magnetomotive force vector in the second mode during the regeneration of the embodiment.
Figure 10:
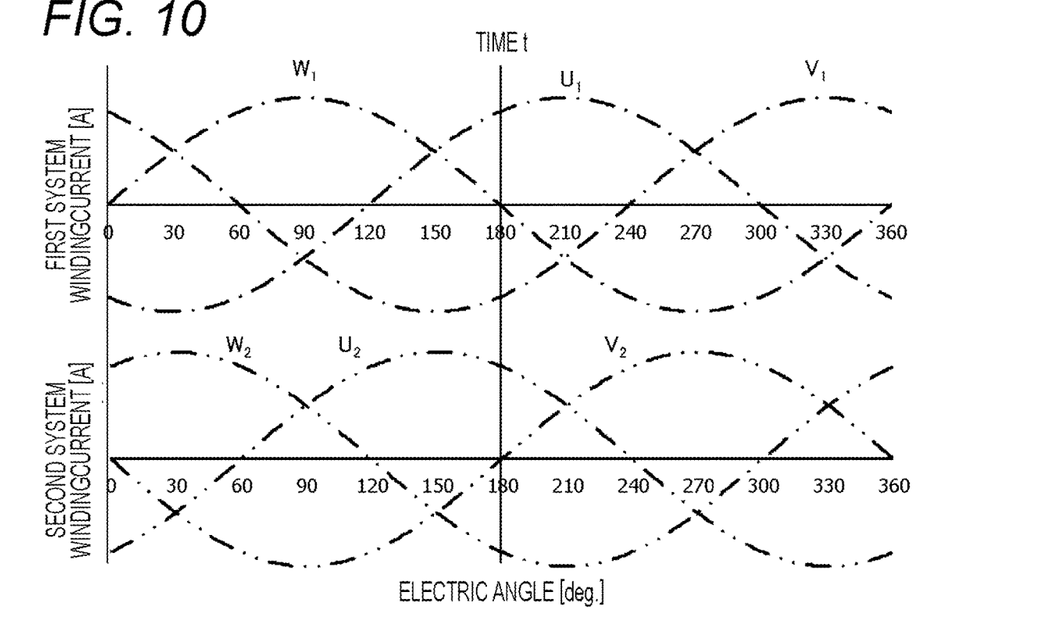
FIG. 10 is a diagram illustrating the current waveform in the second mode during the regeneration of the embodiment.

FIG. 9 is a diagram illustrating the magnetomotive force vector in the second mode during regeneration, and FIG. is a diagram illustrating the current waveform in the second mode during the regeneration. The control microcomputer 203 selects the second mode during the regeneration at the time of deceleration according to the operation amount of the throttle pedal or the brake pedal by the driver, and controls the amplitude and the phase of the current flowing to the armature winding 102 of the rotating electric machine 100.

In the second mode during the regeneration, the currents of different phases (for example, 300° as illustrated in FIG. 10) are caused to flow through the armature windings 102 of each systems, and the control is performed such that the direction of the magnetomotive force by the armature windings 102 of the first system and the direction of the magnetomotive force by the armature windings 102 of the second system are orthogonal to each other. Specifically, as illustrated in FIG. 9, the direction of the magnetomotive force of each system is shifted by 90° of a sum of the phase difference 60° of the current of each system and the difference (30° in FIG. 9) of the winding position of the armature winding 102 of each system, and the combined magnetomotive force becomes small. In the second mode, because the current amplitude Ia and the current phase β (current phase β=180) are adjusted such that the current value increases with respect to the target torque, the efficiency of the generator increases, and the current for obtaining the desired torque (braking force) increases.

As described above, the control microcomputer 203 selects the first mode, the second mode, or another operation mode during the power running according to the operation amount of the throttle pedal by the driver, and controls the amplitude and the phase of the current flowing through the armature winding 102 of the rotating electric machine 100. For example, in the first mode during the regeneration, the current value can be reduced in order to obtain the braking torque, the amount of energy charged in the battery 201 can be reduced as compared with the second mode, and the control can be performed such that the SOC of the battery 201 does not become high.

On the other hand, in the second mode during the regeneration, the current value can be increased in order to obtain the braking torque, the amount of energy charged in the battery 201 increases, and the energy efficiency can be improved. For this reason, in the state in which the SOC of the battery 201 is high, the first mode may be selected to reduce the electric power charged in the battery 201 while the required braking force is obtained, and in the state where the SOC of the battery 201 is low, the second mode may be selected to increase the electric power charged in the battery 201.

In particular, in the automobile in which one-pedal control for controlling from the acceleration to the deceleration with the single throttle pedal described above, a margin in which the battery 201 can receive the electric power is required because the deceleration control is performed by the regenerative brake when the operation amount of the throttle pedal is small. For this reason, during the one-pedal control, when the first mode and the second mode are switched according to the SOC of the battery 201, the SOC of the battery 201 can be controlled so as not to be high, and the vehicle can be smoothly controlled.

Figure 11:
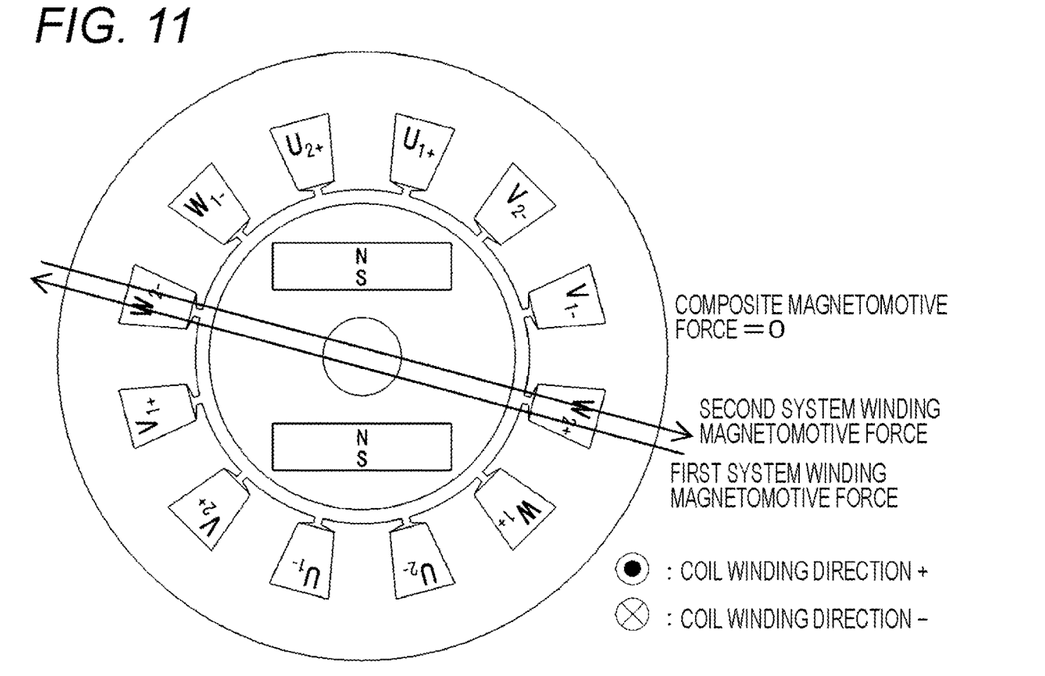
FIG. 11 is a diagram illustrating the magnetomotive force vector during forced discharge (third mode) of the embodiment.
Figure 12:
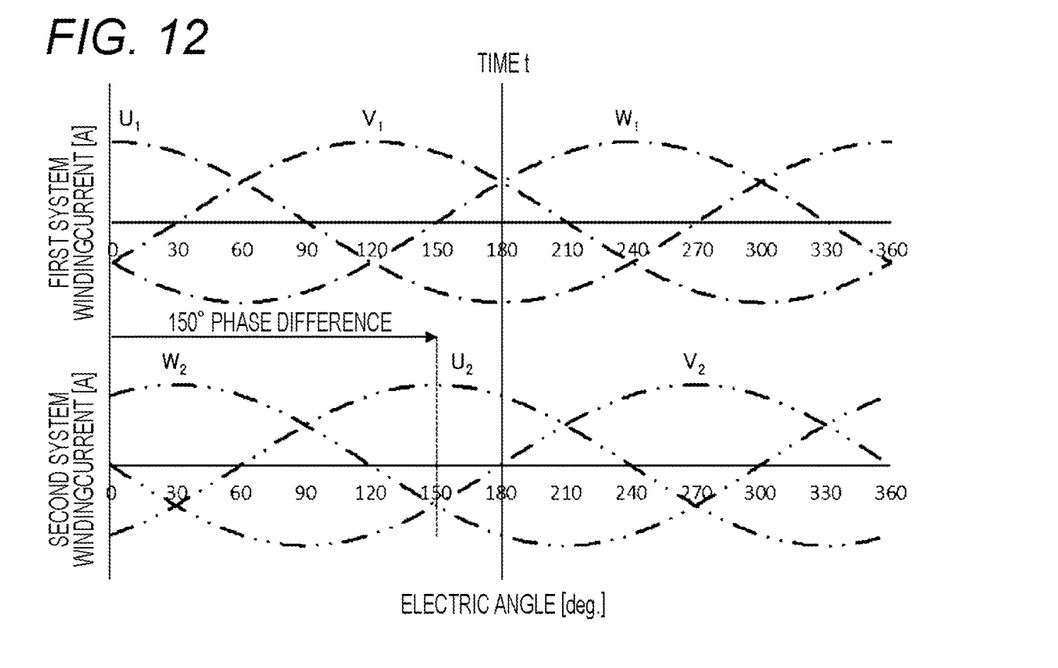
FIG. 12 is a diagram illustrating the current waveform during the forced discharge (third mode) of the embodiment.

FIG. 11 is a diagram illustrating the magnetomotive force vector in a discharge mode (third mode), and FIG. 12 is a diagram illustrating the current waveform in the discharge mode (third mode).

The third mode is a mode for discharging charges of the battery 201 and the capacitor 202. For example, the third mode is used when the vehicle consumes the energy of the battery 201 during coast running (torque=0) or when the vehicle rapidly discharges the charge of the capacitor 202 during stopping.

In the third mode, the currents of different phases (for example, 150° as illustrated in FIG. 12) are caused to flow through the armature winding 102 of each system, and the control is performed such that the direction of the magnetomotive force by the armature winding 102 of the first system and the direction of the magnetomotive force by the armature winding 102 of the second system are opposite to each other. Specifically, as illustrated in FIG. 11, the direction of the magnetomotive force of each system is shifted by 180° of the sum of the phase difference of 150° of the current of each system and the difference (30° in FIG. 11) of the winding position of the armature winding 102 of each system, the combined magnetomotive force becomes zero, and the torque is not generated.

In the conventional discharge mode, the rotor is stopped and the CD current flows to the armature winding 102 of a specific system, so that there is a problem in that the specific armature winding 102 generates heat according to the DC resistance of the armature winding 102. In addition, the magnet generates heat because a magnetic field due to the current flowing through the armature winding 102 is generated immediately above the magnet. However, in the third mode of the embodiment, because the AC current flows through the armature windings 102 of the two systems, a calorific value (temperature rise) of the armature windings 102 can be averaged. In addition, the magnet does not generate the heat because the magnetic fields are canceled by the windings of the two systems.

In addition, in what is called the look-ahead control in which the running is controlled in consideration of the situation of the future running route, desirably the charging and discharging of the battery 201 depending on the gradient of the previous road and the traffic situation. For example, when the battery 201 is actively discharged in the third mode during the coast running before entering the downhill, the required braking force by the regenerative brake is obtained on the downhill. In addition, when the EV running is desired at a congestion spot of the running route ahead, before the congestion spot, the power consumption may be suppressed by the first mode during the power running, or the charge amount may be increased by the second mode during the regeneration to secure the electric power for the EV running.

In addition, when an occupant is required to be rescued because the vehicle is in an emergency stop due to an accident or a failure, the battery 201 is required to be shut off and the electric power of the capacitor 202 is required to be quickly discharged. At this point, electric shock of a rescuer can be prevented by consuming the electric power of the capacitor 202 in the third mode.

As described above, according to the embodiment of the present invention, in the control device (the control microcomputer 203 of the rotating electric machine control device 16) that controls the rotating electric machine 100 including the windings of the plurality of independent systems, the rotating electric machine 100 is controlled by the first mode in which the AC current is passed through the windings of the plurality of systems to generate the torque such that the combined magnetic field generated in the windings is greater than or equal to the predetermined value and the second mode in which the alternating current having the phase difference different from the first mode is passed through the windings of the plurality of systems to cause the combined magnetic field generated in the windings to be smaller than the predetermined value, and the current greater than or equal to that of the first mode is passed in the second mode. Consequently, the driving force and the braking force of the rotating electric machine can be controlled in consideration of the SOC of the battery. That is, the electric power of the battery 201 can be actively consumed while the required driving torque is generated by the second mode during the power running, and the electric power charged in the battery 201 can be reduced while the required braking torque is generated by the first mode during the regeneration. For this reason, the temperature rise of the armature winding 102 can be suppressed. In addition, as compared with the conventional control in which the power consumption of the battery 201 is adjusted by the magnitude of a d-axis current, because the power consumption is adjusted by flowing the AC current through the windings of the two systems, the temperature rise of the armature winding 102 can be equalized, and the temperature rise of the magnet can be suppressed.

In addition, the control device controls the motor in the third mode in which the electric power of at least one of the battery 201 and the capacitor 202 is consumed by the AC current flowing through the winding while the combined magnetic field generated is set to zero by energizing the AC currents having different phases to the windings of the plurality of systems. The magnetic field generated by the three-phase AC current flowing through the armature winding 102 of the first system and the magnetic field generated by the three-phase AC current flowing through the armature winding 102 of the second winding are canceled, and the armature winding 102 is energized without generating the torque. Consequently, the capacitor 202 provided at the preceding stage of the inverter circuit 210 that supplies the AC power to the rotating electric machine 100 can be efficiently and quickly discharged, and the charge amount of the battery 201 can be reduced during the coast running.

In addition, the control device switches between the power running control and the regenerative control by the operation amount of one pedal, and switches between the first mode and the second mode according to the charge amount of the battery 201 during the regenerative control. Consequently, the charge amount of the battery 201 can be adjusted while the acceleration or the deceleration is generated according to the situation of the vehicle, the control can be performed such that the SOC of the battery 201 does not become high, and the vehicle can be smoothly controlled.

The present invention is not limited to the above-described embodiment, but includes various modifications and equivalent configurations within the spirit of the appended claims. For example, the above embodiment has been described in detail for easy understanding of the present invention, and the present invention is not necessarily limited to the embodiment having all the configurations described above. A part of the configuration of one embodiment may be replaced with the configuration of another embodiment. The configuration of another embodiment may be added to the configuration of a certain embodiment. In a part of the configuration of each embodiment, another configuration may be added, deleted, or replaced.

In addition, a part or all of the above-described configurations, functions, processing units, processing means, and the like may be implemented by hardware by, for example, designing with an integrated circuit, or may be implemented by software by a processor interpreting and executing a program for implementing each function.

Information such as a program, a table, and a file implementing each function can be stored in a storage device such as a memory, a hard disk, and a solid state drive (SSD), or a recording medium such as an IC card, an SD card, and a DVD.

The control line and the information line indicate those which are considered necessary for the description, but do not necessarily indicate all the control lines and information lines necessary for the mounting. Actually, it can be considered that almost all the components are connected to each other.

REFERENCE SIGNS LIST 10 vehicle
11 front wheel
12 engine
13 transmission
16 rotating electric machine control device
100, 101 rotating electric machine
102 armature winding
110 position detector
120 AC output line
130 current sensor
14 differential gear
201 battery
201a, 201b DC bus
202 capacitor
203 control microcomputer
204 driving circuit
210 inverter circuit
211 bridge circuit

The invention claimed is:

1. A control device controlling a rotating electric machine including windings of a plurality of independent systems, wherein the rotating electric machine is controlled in:
   a first mode in which an AC current is energized to the windings of the plurality of independent systems to generate torque such that a combined magnetic field generated in the windings of the plurality of independent systems is greater than or equal to a predetermined value; and
   a second mode in which the AC current having a phase difference different from that in the first mode is energized to the windings of the plurality of independent systems, the combined magnetic field generated in the windings of the plurality of independent systems is made smaller than the predetermined value, and current greater than or equal to that in the first mode flows,
   wherein power running control and regenerative control are switched by an operation amount of one pedal, and during the regenerative control, the first mode and the second mode are switched according to a charge amount of a battery.

2. The control device according to claim 1, wherein the rotating electric machine is controlled by a third mode in which an AC current having a different phase is energized to the windings of the plurality of independent systems, the combined magnetic field generated is set to zero, and electric power of at least one of a battery and a capacitor is consumed by the AC current flowing through the windings of the plurality of independent systems.

3. A control method for controlling a rotating electric machine including windings of a plurality of independent systems, wherein the rotating electric machine is controlled in:
   a first mode in which a control device that controls the rotary electric machine energizes the windings of the plurality of independent systems with an AC current to generate driving torque such that a combined magnetic field generated in the windings of the plurality of independent systems is greater than or equal to a predetermined value; and
   a second mode in which the AC current having a phase difference different from that in the first mode is energized to the windings of the plurality of independent systems, the combined magnetic field generated in the windings of the plurality of independent systems is made smaller than the predetermined value, and current greater than or equal to that in the first mode flows,
   wherein the control device:
      switches between power running control and regenerative control by an operation amount of one pedal; and
      switches between the first mode and the second mode according to a charge amount of a battery during the regenerative control.

4. The control method according to claim 3, wherein the control device further controls the rotating electric machine in a third mode in which an AC current having a different phase is energized to the windings of the plurality of independent systems, the combined magnetic field generated is set to zero, and electric power of at least one of a battery and a capacitor is consumed by the AC current flowing through the windings of the plurality of independent systems.

* * * * *